(12) United States Patent
Tanaka et al.

(10) Patent No.: US 6,485,772 B1
(45) Date of Patent: Nov. 26, 2002

(54) COCOA POWDER RICH IN POLYPHENOLS, PROCESS FOR PRODUCING THE SAME AND MODIFIED COCOA CONTAINING THE SAME

(75) Inventors: Masahiro Tanaka, Saitama (JP); Masakazu Terauchi, Saitama (JP)

(73) Assignee: Meiji Seika Kaisha, Ltd., Tokyo (JP)

( * ) Notice: Subject to any disclaimer, the term of this patent is extended or adjusted under 35 U.S.C. 154(b) by 0 days.

(21) Appl. No.: 09/719,179

(22) PCT Filed: Jun. 10, 1999

(86) PCT No.: PCT/JP99/03108
§ 371 (c)(1),
(2), (4) Date: Dec. 15, 2000

(87) PCT Pub. No.: WO99/65322
PCT Pub. Date: Dec. 23, 1999

(30) Foreign Application Priority Data

Jun. 18, 1998 (JP) ............................................. 10-171323

(51) Int. Cl.$^7$ ................................................. A23G 1/00
(52) U.S. Cl. ....................................... 426/593; 426/631
(58) Field of Search ................................. 426/631, 593

(56) References Cited

U.S. PATENT DOCUMENTS 6,015,913 A * 1/2000 Kealey et al. .............. 424/769
6,194,020 B1 * 2/2001 Myers et al. ................ 424/769
6,312,753 B1 * 11/2001 Kealey et al. .............. 426/542

OTHER PUBLICATIONS

Minifie, B. 1980. Choclate, Cocoa and Confectionery: Science and Technology, 2$^{ND}$ Edition. AVI Publishing Co., Inc. Westport, CT, pp. 45–52.*

* cited by examiner

*Primary Examiner*—Carolyn Paden
(74) *Attorney, Agent, or Firm*—Rader, Fishamn & Grauer PLLC

(57) ABSTRACT

The invention provides a treating process of cacao beans, and more particularly cacao powder rich in polyphenols, a process for the preparation thereof and a prepared cacao composed of the cacao powder. According to the invention, the polyphenol contained in the cacao beans is allowed to remain as much as possible, by setting initial water content in the roasting treatment to 3–10% by weight. Although polyphenols have various favorable biological functions of anti-oxidating action, anti-dental cariesing action, action for preventing arteriosclerosis and so on, but those are unfavorable from the view point of taste because of astringency and bitterness. In a conventional process for preparing cacao powder, therefore, an operation for removing polyphenols has been carried out, but in the invention, the astringency and bitterness are inhibited by setting water content of the cacao nib to 3–10% by weight in the alkali treatment prior to the roasting treatment. Therefore, the invention provides a high functional cacao powder with good taste.

12 Claims, 1 Drawing Sheet

Water content (% by weight)

COCOA POWDER RICH IN POLYPHENOLS, PROCESS FOR PRODUCING THE SAME AND MODIFIED COCOA CONTAINING THE SAME

TECHNICAL FIELD

The present invention relates to a process for treating cacao beans and more particularly, a cacao powder rich in polyphenols, process for the preparation thereof and prepared cacao comprising the same.

BACKGROUND ART

A conventional cacao powder has been prepared through steps of crushing washed raw cacao beans to remove a shell and embryo and obtain a cacao nib, treating with an alkali the cacao nib, roasting the cacao nib, grinding the roasted cacao nib, expressing oil, and pulverizing the oil expressed substance.

In general, the alkali and roasting treatments are started with such initial conditions that an amount of water is 10–25% by weight inclusive of moisture in the cacao nib and pH is 6.8–8.0.

The prepared cacao is prepared by adding sugar, powdered milk and the like to the cacao powder prepared as above to adjust its taste, and if necessary, agglomerating the resulting mixed powder. A cacao beverage prepared by dissolving the prepared cacao with hot water has been widely and habitually drunk.

While, the polyphenols are watched substances with great interest, since such reports have been made through recent studies that the compounds have various and biologically favorable functions inclusive of anti-oxidating action, anti-dental caries action, action for preventing arteriosclerosis, inhibiting action of carcinogenesis, anti-stressing action, anti-bacillus and virus actions, anti-allergy action and others.

However, a cacao polyphenol (may be abbreviated hereinafter as "CMP") which is one of polyphenols and contained in the cacao beans shows astringency and bitterness, and thus a cacao powder containing CMP in higher amount can not be said as preferable one from view point of taste. In the conventional process for preparing the cacao powder, therefore, the cacao nib is treated with the alkali to increase solubility and reduce the astringency and bitterness and in other words, the process reduces the amount of CMP originally presenting in the cacao beans. Therefore, there is no measure other than increasing the intaking amount of the cacao beverage or using a prepared cacao which contains the cacao powder in excess amount, is not well-balanced with the sugar and milk and is not preferable from view point of taste, in order to intake the biologically favorable CMP as much as possible by using an adjusted cacao composed the conventional cacao powder.

DISCLOSURE OF INVENTION

Basic objects of the invention, therefore, to provide a process for preparing a cacao powder under treating conditions which do not reduce an amount of CMP presenting in cacao beans, as possible, the cacao powder rich in CMP, to be obtained by the process, and a prepared cacao comprising the cacao powder.

Final object of the invention lies in providing a good cacao powder which is not spoiled in taste, in spite of that its CMP content is kept in higher level, to make easy intake of CMP which is excellent in functions.

The inventors have energetically studied and investigated for dissolving said problems and attaining said objects. As a result, they have obtained such findings to establish the invention that preparation of the cacao powder rich in CMP (may be abbreviated hereinafter as "HPC") is possible by adjusting roasting conditions of a cacao nib, and that the astringency and bitterness inherent to CMP can be sharply inhibited by adjusting treating conditions with an alkali, prior to the roasting treatment, in spite of that the cacao powder has relatively high CMP content and although an amount of CMP somewhat reduces than that contained in the cacao beans.

Namely, the invention relates to a process for preparing a cacao powder rich in polyphenols, which is characterized by subjecting a cacao nib to an alkali treatment under water content condition of 3–10% by weight or the cacao nib to a roasting treatment by setting initial water content of 3–10% by weight, without carrying out the alkali treatment, and then carrying out steps of grinding, oil expression and pulverization, in order; the cacao powder obtained by the process; and a prepared cacao composed of the cacao powder.

The basic matter of the process according to the invention lies in that the amount of CMP presenting in the cacao beans does not reduce, as possible, through steps for preparing the cacao powder and thus, it is preferable to use cacao beans in kind and place of production, which contain CMP in higher level, as much as possible, in order to obtain a cacao powder rich in CMP. For instance, the cacao beans produced in Ghana, which have been widely selected for preparing the cacao powder contain CMP of about 3.3% by weight in raw beans, and while the cacao beans produced in Ecuador show higher CMP content of 3.6–6.3% by weight and thus, it is advantageous to use the cacao beans produced in Ecuador, since the amount of CMP is higher than those produced in Ghana. The cacao beans produced in Venezuela can be exemplified as those containing CMP in higher amount, excepting those produced in Ecuador.

In case of carrying out the process according to the invention, taste of finally obtained cacao powder becomes good, if an alkali is added to make final pH to 5.0–7.5 and more preferably to 6.6–7.0, in the alkali treatment. When potassium carbonate, sodium carbonate or the like is used as the alkali, it is preferable to add the same in an amount not exceeding 2.0% by weight to the cacao nib.

It is preferable to set water content in the cacao nib in a reaction vessel for subjecting the cacao nib to the alkali treatment in lower level, as possible, so that CMP presenting in the cacao beans remains in an amount as much as possible. Since moisture contained in the cacao nib per se is 3–7% by weight, in usual cases and thus it is necessary to carry out the treatment under the water content condition of 3–10% by weight, by setting possible adding water of an amount not exceeding 7% by weight.

Further, it is preferable to carry out the alkali treatment under controls of temperature in a range of 50–100° C. and stirring time period in a range of 5–30 minutes to finish the reaction under lower temperature condition and shorter period of time, as possible, so as to remain CMP as much as possible.

In the roasting step for carrying out the process according to the invention, it is preferable to set shorter roasting period of time, in order to remain CMP presenting in the cacao beans in maximum level, but it necessary to consider various conditions on an amount of adding water, temperature, roasting period of time and others, in response to kind of the cacao beans for taking out inherent flavor and taste due to the kind of cacao beans. In a usual case, such conditions for the roasting treatment are preferable as standards that initial water content is 3–10% by weight, final temperature of the cacao nib is 120–125 C., and roasting period of time is about 30–50 minutes. For instance, the cacao nib with nice taste can be obtained by if necessary, adding water to make water content of the cacao nib at roast starting time as 10% by weight and then roasting the same for 40 minutes, so as to reach final temperature of the roasted cacao nib to 123 C. (final moisture content of the roasted cacao nib: about 2% by weight), when the cacao beans produced in Ecuador are selected. In case of the cacao beans produced in Ecuador, bright flavor inherent to the beans becomes strong, but grassy-smelling generates, when the final temperature of cacao nib is lower than 123 C., and the flavor becomes poor and taste becomes heavy feeling, when the roasting is carried out until the final temperature of cacao nib exceeds 123 C.

It is preferable that moisture content of the roasted cacao nib is 1–5% by weight and in such a range of moisture content, almost no lowering of CMP content occurs in subsequent grinding and oil expressing steps.

The subsequent step of oil expression from the roasted cacao nib can be carried out in a conventional manner. In the conventional cacao powder, there are two types containing oil as final content of 12–14% by weight and 22–24% by weight, but it is preferable to carry out the oil expression, so that the final oil content becomes 12–14% by weight, to increase CMP content therein. When the process according to the invention is carried out with use of the cacao beans produced in Ecuador, HPC containing CMP of 7–11% by weight can be obtained by carrying out the oil expression, so as to make the final oil extent to 12% by weight. In this case, HPCs containing CMP of 7–9% by weight have proper astringency and bitterness to show nice taste.

When the oil expression is carried out, so as to make final oil extent to 22% by weight, HPCs containing CMP of 6–10% by weight can be obtained.

The prepared cacao can be obtained by composing a saccharoid, powdered milk and edible additive(s) in the HPC and mixing the same or agglomerating mixture in the form of powder in a conventional manner.

BEST MODES FOR CARRYING OUT THE INVENTION

Figure 1:
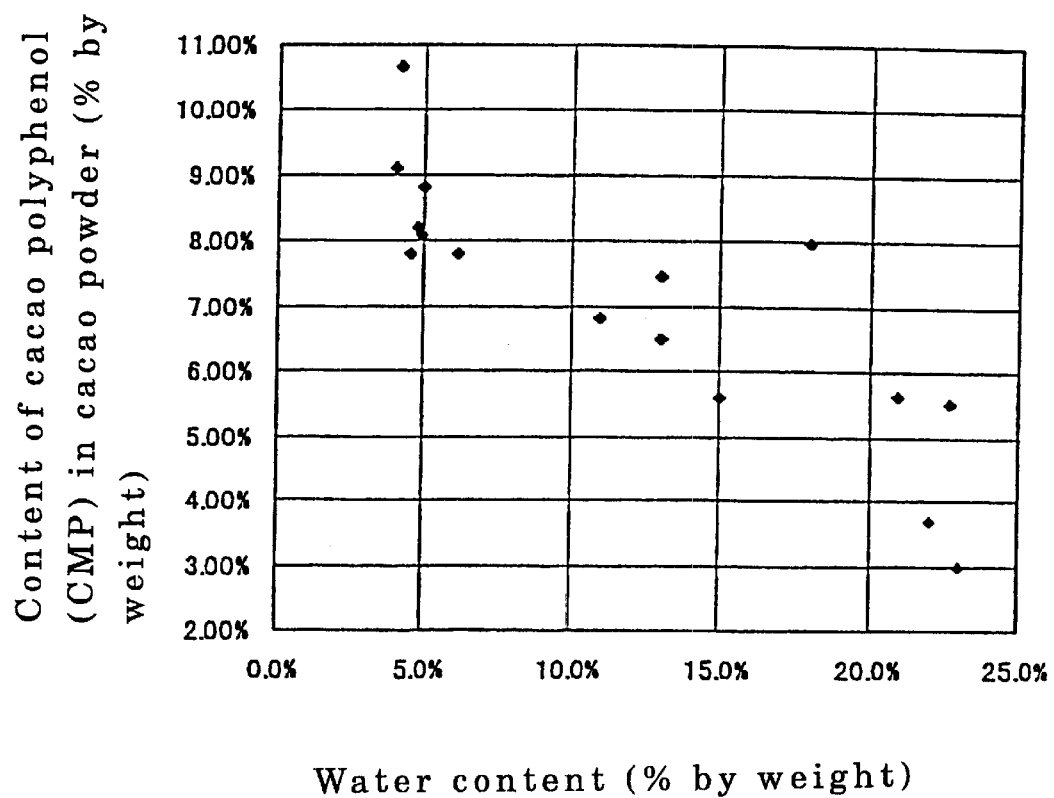
FIG. 1 shows a relation between moisture content in cacao nib which has been alkali treated or just prior to roasting treatment and without the alkali treatment and content of cacao polyphenol (CMP) in finally obtained cacao powder.

Now, the invention shall be explained in more detail and concretely with reference to Examples, Comparative Examples and Test Examples.

A measurement of cacao polyphenol in the cocoa powder obtained by the Examples and Comparative Examples had been made by following method. Namely, the resulting cacao powder was treated by hexane for defatting and treated by water-containing methanol for extracting CMP in the cacao powder, and then an amount of CMP was measured by the prussian blue method. As the water-containing methanol, 50% aqueous methanol solution was used, and the prussian blue method was carried out in accordance with that described in "Methods in Enzymology", Vol. 234, pages 432–433 (edited by Packer), in which commercially available epicatechin was selected as standard compound.

EXAMPLE 1

To a cacao nib obtained in a conventional manner from cacao beans produced in Ecuador, a solution of 0.9% by weight of potassium carbonate in 1.35% by weight of water was added and pH thereof was adjusted to 6.8. The resulting solution was poured into a reaction vessel with jacket temperature at 100 C., and stirring was started, when temperature of the solution reached 50 C. and continued for 15 minutes for alkali treating the cacao nib. Temperature of the solution at the time, when the reaction was just finished, was 80 C. and moisture content of the alkali treated cacao nib was 6.1% by weight. To the alkali treated cacao nib, water of 3.8% by weight was added and roasting thereof was initiated by an indirect heating type roaster and the roasting treatment was carried out until the final temperature of the cacao nib reaches 123 C. for 40 minutes. After ground the roasted cacao nib, oil expression was carried out, so as to make oil content to 12% by weight, and then pulverized to prepare HPC.

EXAMPLE 2

HPC was prepared by the process similar to that described in Example 1, excepting that the alkali treatment was omitted and roasting treatment was initiated under initial conditions of moisture content of 5.0% by weight and pH of 5.7.

EXAMPLE 3

To 16% by weight of HPC obtained by Example 1, 40% by weight of sugar, 23% by weight of lactose, 15% by weight of total powdered milk, 5% by weight of defatted milk powder and 1% by weight of other edible material(s) were composed to prepare a powdery prepared cacao or the powdery prepared cacao was subjected to wet agglomeration to prepare prepared cacao granules comprising HPC.

The prepared cacao shows nice taste and excellent in solubility, and contains CMP in twice amount, in comparison with a prepared cacao having a composition same with the above, excepting of using general or conventional cacao powder (CMP content: 3.9% by weight) and in accordance with a process similar to that described in Comparative Example 1 given later, excepting that cacao nib derived from cacao beans produced in Ghana was used and oil was expressed until oil content reaches 22% by weight.

Comparative Example 1

A process similar to that described in Example 1 was carried out to prepare cacao powder, excepting that to cacao nib derived from cacao beans produced in Ecuador, a solution of 1.8% by weight of potassium carbonate in 12.7% by weight of water was added and pH thereof was 6.8, the resulting solution was poured into a reaction vessel with jacket temperature of 120° C., an alkali treatment was carried out at 120° C. under steam pressure and stirring for 20 minutes, and then roasting was carried out to the alkali treated cacao nib with water content of 23.0% by weight.

Comparative Example 2

A process similar to that described in Example 1, excepting that to cacao nib derived from cacao beans produced in Ecuador, water of 10.0% by weight was added and pH thereof was 6.0, a treatment of heating at 120° C. under steam pressure and stirring for 20 minutes in a reaction vessel with jacket temperature of 120° C. was carried out in lieu of the alkali treatment, and then roasting was carried out to the resulting cacao nib with water content of 23.0% by weight.

Test Example 1

CMP content in the cacao powder obtained by Examples 1 and 2 as well as Comparative Examples 1 and 2 was measured, respectively and taste of each cacao powder was evaluated. Results are shown in following Table 1.

TABLE 1

|  | CMP content | Taste evaluation |
| --- | --- | --- |
| Example 1 | 7.8 (% by weight) | good : weak astringency and bitterness, and light aroma. |
| Example 2 | 8.8 | approve : somewhat strong astringency and bitterness, and there is favorable aroma. |
| Comparative Example 1 | 3.0 | good : no astringency and bitterness, and nice favorable aroma. |
| Comparative Example 2 | 3.7 | approve : noticeable astringency and bitterness, and there is favorable aroma. |

Test Example 2

Various cacao powders were prepared according to the process similar to that described in Example 1, excepting that water content of the alkali treated cacao nib are different, and the process similar to Example 2, excepting that water content of the non-alkali treated cacao nib just before the roasting treatment are different, to compare CMP content in each cacao powder and the initial water content of the cacao nib in the roasting treatment.

Results are shown in FIG. 1. It became clear that the repression of water content in the cacao nib during its alkali treatment, as lower as possible, is preferable, in order to increase remaining amount of CMP in the cacao powder, and CMP content in the cacao powder can be made to 7% by weight or more, when water content in the cacao nib at the beginning of the roasting treatment is repressed to 10% by weight or less.

Industrial Applicability

Cacao beans contains polyphenols which have been recently reported as the substances having biologically favorable functions inclusive of anti-oxidating action, anti-dental caries action, action for preventing arteriosclerosis and others. However, the polyphenols show astringency and bitterness and thus cannot be said as a preferable ingredient from view point of the taste. Hitherto, therefore, cacao beans containing the polyphenols in lower amount have been used for preparing cacao powder and the conventional process for preparing the cacao powder contains a step for lowering content of the polyphenols. On the contrary thereto, the invention provides cacao powder remaining polyphenols in large amount as much as possible and shows excellent taste. Therefore, the cacao powder according to the invention is excellent in its functions.

What is claimed is:

1. A process for preparing a cacao powder rich in polyphenols, comprising the steps of:

roasting a cacao nib having a water content of 3% to 10% by weight;

grinding the roasted cacao nib;

expressing the oil from the ground cacao nib; and pulverizing the oil expressed substance, thereby to produce a cacao powder having a cacao polyphenol content of 7% to 9% by weight.

2. A process as claimed in claim 1, characterized in that said oil expression is carried out, so as to make final oil content of the cacao powder to 12–14% by weight.

3. A process as claimed in claim 2, characterized in that the cacao nib is subjected to an alkali treatment under condition of water content of 3–10% by weight, prior to the roasting treatment.

4. A process as claimed in claim 3, characterized in that said alkali treatment is carried out by adding an alkali to the cacao nib in an amount not exceeding 2.0% by weight and adjusting final pH to 5.0–7.5.

5. A process as claimed in claim 1, characterized in that the cacao nib is subjected to an alkali treatment under condition of water content of 3–10% by weight, prior to the roasting treatment.

6. A process as claimed in claim 5, characterized in that said alkali treatment is carried out by adding an alkali to the cacao nib in an amount not exceeding 2.0% by weight and adjusting final pH to 5.0–7.5.

7. A process as claimed in any one of claim 1, 2, 5, or 6, characterized in that said cacao nib is that deriving from cacao beans produced in at least one of Ecuador and Venezuela.

8. A cacao powder rich in polyphenols, which is obtained by the process described in any one of claim 1,2,5 or 6.

9. A cacao powder rich in polyphenols as claimed in claim 8, characterized in that cacao polyphenol content is 7–9% by weight.

10. A prepared cacao characterized in that cacao powder rich in polyphenols and described in claim 9 is composed therein.

11. A prepared cacao characterized in that cacao powder rich in polyphenols and described in claim 8 is composed therein.

12. A cacao powder comprising a cacao polyphenol content of 7% to 9% by weight produced by performing the steps of:

roasting a cacao nib having a water content of 3% to 10% by weight;

grinding the roasted cacao nib;

expressing the oil from the ground cacao nib; and pulverizing the remaining cacao nib.

* * * * *